United States Patent
Kakimoto et al.

(10) Patent No.: US 11,455,544 B2
(45) Date of Patent: Sep. 27, 2022

(54) PREDICTION MODEL GENERATION DEVICE, PREDICTION MODEL GENERATION METHOD, AND RECORDING MEDIUM

(71) Applicant: KABUSHIKI KAISHA TOSHIBA, Minato-ku (JP)

(72) Inventors: Mitsuru Kakimoto, Kawasaki (JP); Hiromasa Shin, Yokohama (JP); Yoshiaki Shiga, Kawasaki (JP); Masaaki Takada, Kita (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1239 days.

(21) Appl. No.: 15/915,569

(22) Filed: Mar. 8, 2018

(65) Prior Publication Data

US 2019/0138913 A1 May 9, 2019

(30) Foreign Application Priority Data

Nov. 7, 2017 (JP) .............................. JP2017-214789

(51) Int. Cl.
*G06N 5/02* (2006.01)
*G06N 20/00* (2019.01)

(52) U.S. Cl.
CPC .............. *G06N 5/02* (2013.01); *G06N 20/00* (2019.01)

(58) Field of Classification Search
CPC .. G06F 2119/06; G06F 30/367; G06N 3/0454
See application file for complete search history.

(56) References Cited

U.S. PATENT DOCUMENTS 9,639,642 B2   5/2017 Jetcheva et al.
10,084,658 B2 * 9/2018 Dabbagh ............... H04L 41/147
(Continued)

FOREIGN PATENT DOCUMENTS

JP   2006-221310     8/2006
JP   2007-233639 A   9/2007
(Continued)

OTHER PUBLICATIONS

Julia Kopf, et al. "The Potential of Model-Based Recursive Partitioning in the Social Sciences—Revisiting Ockham's Razor" URL:hhttps://web.archive.org/web/20170812135605/https://epub.ub.uni-muenchen.de/11933/1/mob_techreport.pdf, Feb. 11, 2010, [search on May 12, 2020], pp. 1-24 and cover page.

*Primary Examiner* — William G Trost, IV
*Assistant Examiner* — Christopher P Cadorna
(74) *Attorney, Agent, or Firm* — Oblon, McClelland, Maier & Neustadt, L.L.P.

(57) ABSTRACT

A prediction model generation device has a first storage unit that stores a plurality of explanatory variables, a second storage unit that stores a plurality of objective variables, an input unit that inputs instruction information on classification, a class generation unit that generates a plurality of classes based on the instruction information, and a prediction model calculation unit that calculates a plurality of prediction models corresponding to the plurality of classes. The prediction model calculation unit has a learning data set extraction unit that extracts a learning data set corresponding to each of the plurality of classes from among the plurality of explanatory variables and the plurality of objective variables.

15 Claims, 6 Drawing Sheets

(56) References Cited

U.S. PATENT DOCUMENTS

| | | | |
|---|---|---|---|
| 2002/0127529 A1* | 9/2002 | Cassuto | G09B 5/02 434/335 |
| 2007/0233477 A1* | 10/2007 | Halowani | H03M 7/30 704/232 |
| 2010/0325071 A1 | 12/2010 | Roverso | |
| 2016/0140583 A1* | 5/2016 | Amemiya | G06Q 30/0202 705/7.31 |

FOREIGN PATENT DOCUMENTS

| | | |
|---|---|---|
| JP | 2009-222620 | 10/2009 |
| JP | 2010-537192 | 12/2010 |
| JP | 2013-196037 A | 9/2013 |
| JP | 2013-255390 | 12/2013 |
| JP | 2015-76091 A | 4/2015 |

\* cited by examiner

| id | YEAR | MONTH | DATE | DAY OF WEEK | TIME | TEMPERATURE (°C) | PRECIPITATION AMOUNT (mm/H) | SOLAR IRRADIANCE AMOUNT (W) | ... |
|---|---|---|---|---|---|---|---|---|---|
| 1 | 2018 | 1 | 1 | MONDAY | 0 | 5 | 0 | 0 | |
| 2 | 2018 | 1 | 1 | MONDAY | 1 | 5 | 0 | 0 | |
| 3 | | | | | | | | | |
| ... | | | | | | | | | |
| | | | | | | | | | |
| | | | | | | | | | |
| N | 2022 | 8 | 4 | WEDNESDAY | 12 | 32 | 0 | 900 | |

FIG. 2

| id | DEMAND (Mwh) |
|---|---|
| 1 | 304.3 |
| 2 | 320.3 |
| 3 | |
| ... | |
| | |
| | |
| N | 883.5 |

FIG. 3

PREDICTION MODEL GENERATION DEVICE, PREDICTION MODEL GENERATION METHOD, AND RECORDING MEDIUM

CROSS REFERENCE TO RELATED APPLICATIONS

This application is based upon and claims the benefit of priority from the prior Japanese Patent Application No. 2017-214789, filed on Nov. 7, 2017, the entire contents of which are incorporated herein by reference.

FIELD

Embodiments of the present invention relate to a prediction model generation device, a prediction model generation method, and a recording medium.

BACKGROUND

There has been known a method of generating a model for a prediction when performing a numerical prediction of a certain quantity. However, the same prediction model is not always valid for all conditions. For example, when predicting a demand for power, the supply and demand of power needs to match each other at an arbitrary point in time. It is difficult to greatly change an output of a power generation facility in a short time, and thus, it is necessary to predict a power demand amount in advance and to plan an operation of the power generation facility in accordance with the predicted amount.

The power demand is affected by a date and time, a weather condition, and the like, and thus, it is desirable to perform the demand prediction by generating a prediction model with an element that is likely to affect the demand as an explanatory variable and a prediction value as an objective variable.

However, if there is only one prediction model, there is a risk that prediction performance may greatly fluctuate depending on the date and time, the weather condition, and the like.

BRIEF DESCRIPTION OF THE DRAWINGS

FIG. 2 is a table illustrating examples of explanatory variables in the case of performing a power demand prediction;

FIG. 3 is a table illustrating an example in which a power demand amount indicating a result obtained by performing the power demand prediction is set as an objective variable;

DETAILED DESCRIPTION

A prediction model generation device has a first storage unit that stores a plurality of explanatory variables, a second storage unit that stores a plurality of objective variables, an input unit that inputs instruction information on classification, a class generation unit that generates a plurality of classes based on the instruction information, and a prediction model calculation unit that calculates a plurality of prediction models corresponding to the plurality of classes. The prediction model calculation unit has a learning data set extraction unit that extracts a learning data set corresponding to each of the plurality of classes from among the plurality of explanatory variables and the plurality of objective variables, an evaluation data set extraction unit that extracts an evaluation data set corresponding to each of the plurality of classes from among the plurality of explanatory variables and the plurality of objective variables, a parameter calculation unit that calculates a parameter included in each of the plurality of prediction models based on the learning data set, and a prediction performance evaluation unit that evaluates prediction performance of the plurality of prediction models based on the evaluation data set.

Hereinafter, embodiments will be described with reference to the drawings. In the present specification and accompanying drawings, the description and illustration are given by omitting, changing, or simplifying some components for ease of understanding and convenience in illustration, but technical contents at the extent with which similar functions can be expected are also interpreted as being included in the embodiments.

First Embodiment

Figure 1:
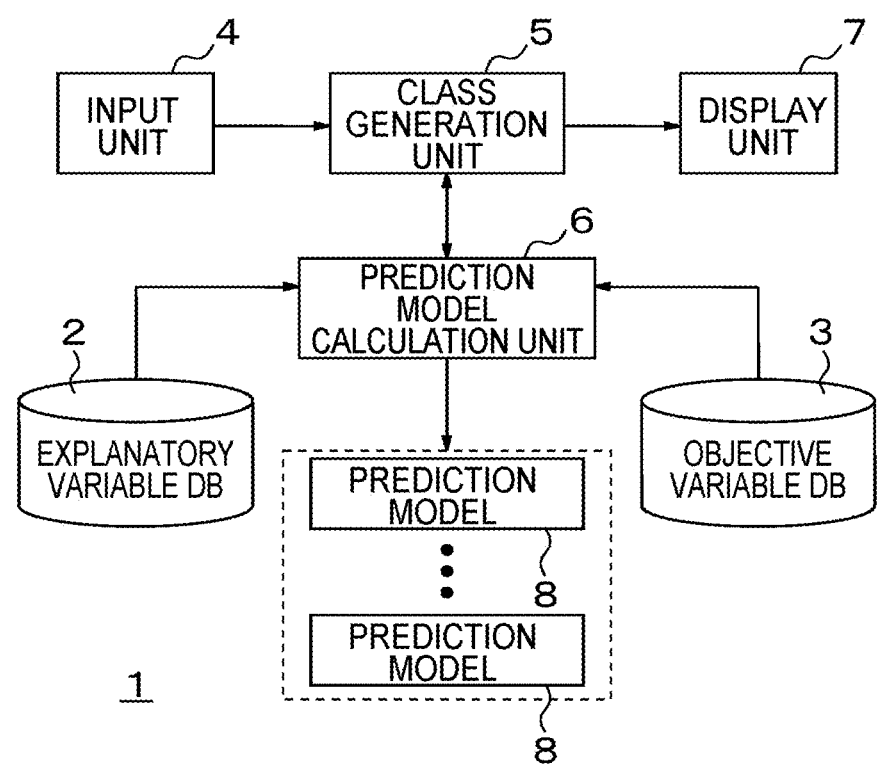
FIG. 1 is a block diagram illustrating a schematic configuration of a prediction model generation device 1 according to a first embodiment.

FIG. 1 is a block diagram illustrating a schematic configuration of a prediction model generation device 1 according to a first embodiment. An object to be predicted by the prediction model generation device 1 in FIG. 1 is not particularly limited, and an example of predicting a demand for power, for example, will be mainly described hereinafter. The demand for power is greatly affected by a date and time. For example, the power demand greatly increases due to cooling in summer and heating in winter. In addition, there is a power demand for business on a weekday, and thus, the demand is generally larger than that on a holiday. Further, the demand is generally larger in a time zone during daytime where people's activities are brisker than those in nighttime. In addition, the demand is also affected by a weather condition. Since the usage of a cooler increases as the temperature gets higher in summer, the demand also increases. Conversely, the demand increases as the temperature gets lower in winter. In addition, the demand is also likely to be affected by the amount of rainfall, the amount of solar irradiance, and the like. The prediction model generation device 1 of FIG. 1 generates a prediction model capable of improving prediction performance on consideration of the fact that the demand fluctuates depending on the date and time, the weather condition, and the like.

The prediction model generation device 1 of FIG. 1 includes an explanatory variable database (an explanatory variable DB or a first storage unit) 2, an objective variable database (an objective variable DB or a second storage unit) 3, an input unit 4, a class generation unit 5, a prediction model calculation unit 6, and a display unit 7.

The explanatory variable DB 2 stores a plurality of explanatory variables. The explanatory variable is input data input to a prediction model 8. FIG. 2 is a table illustrating examples of the explanatory variables in the case of performing the power demand prediction, for example. The example in FIG. 2 includes the plurality of explanatory variables such as an identification number, a year, a month, a date, a day of the week, time, temperature (° C.), a precipitation amount (mm/H), a solar irradiance amount (W). The plurality of explanatory variables are associated with each row in FIG. 2. In the prediction model 8, the plurality of explanatory variables in each row of FIG. 2 are input as input data.

The objective variable DB 3 stores a plurality of objective variables. The objective variable is a prediction value output from the prediction model 8. FIG. 3 illustrates an example in which a power demand amount (Mwh) indicating a result obtained by performing the power demand prediction is set as the objective variable. An identification number in the objective variable DB 3 in FIG. 3 is associated with the identification number in the explanatory variable DB 2 in FIG. 2. That is, the plurality of explanatory variables of each row in the explanatory variable DB 2 of FIG. 2 are associated with the objective variable of the corresponding row in the objective variable DB 3 of FIG. 3.

The input unit 4 inputs instruction information on classification. For example, when a user wishes to generate the prediction model 8 for each day of the week, the user inputs the instruction information to perform classification for each day of the week. Alternatively, the user may input instruction information to perform classification in units of one hour. In this case, there are 24 classes. The user does not necessarily perform classification in finer units. For example, the user may input instruction information to perform classification with three classes, that is, before dawn, daytime, and night-time. Incidentally, the classification is not necessarily performed with only one attribute (for example, date and time information). For example, the classification may be performed by combining a plurality of attributes (for example, the date and time information and the weather condition).

The class generation unit 5 generates a plurality of classes based on the instruction information input by the input unit 4. When there are n (n is an integer of two or more) classes, n prediction models 8 are generated. That is, each of the prediction models 8 is generated in association with each class. The class generation unit 5 generates, for example, a class identifier to identify each class. For example, when there are n classes, n class identifiers are generated. The class generation unit 5 may perform classification based on at least one of the date and time condition and an environmental condition, or may perform classification under another arbitrary condition.

Figure 4:
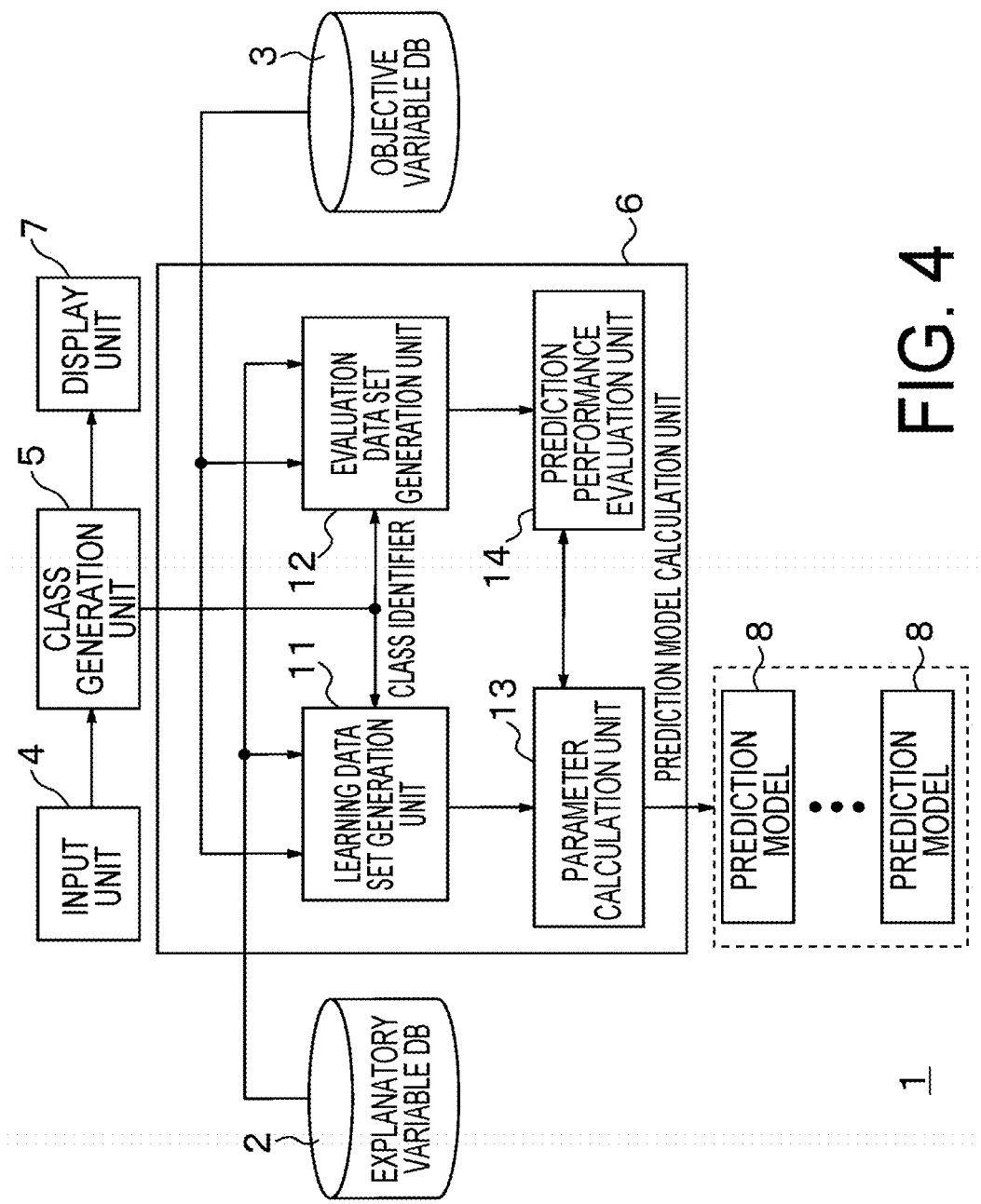
FIG. 4 is a block diagram illustrating an example in which an internal configuration of a prediction model calculation unit of FIG. 1 is embodied.

The prediction model calculation unit 6 calculates the plurality of prediction models 8 corresponding to the plurality of classes. FIG. 4 is a block diagram illustrating an example in which an internal configuration of the prediction model calculation unit 6 of FIG. 1 is embodied. The prediction model calculation unit 6 in FIG. 4 includes a learning data set extraction unit 11, an evaluation data set extraction unit 12, a parameter calculation unit 13, and a prediction performance evaluation unit 14.

The learning data set extraction unit 11 extracts a learning data set corresponding to each of the plurality of classes from among the explanatory variable stored in the explanatory variable DB 2 and the objective variable stored in the objective variable DB 3. For example, when the classification is made for each day of the week, for a class of Friday, the learning data set extraction unit 11 extracts only data entries on Friday from the explanatory variable DB 2 and the objective variable DB 3.

The evaluation data set extraction unit 12 extracts an evaluation data set corresponding to each of the plurality of classes from the explanatory variable stored in the explanatory variable DB 2 and the objective variable stored in the objective variable DB 3. For example, when the classification is made for each day of the week, for a class of Friday, the evaluation data set extraction unit 12 extracts only data entries on Friday from the explanatory variable DB 2 and the objective variable DB 3.

The parameter calculation unit 13 calculates a parameter included in each of the plurality of prediction models 8 based on the learning data set. The parameter is a value that determines a characteristic of the prediction model 8. For example, in the case of using a linear regression model as the prediction model 8, when a set of explanatory variables is represented by a matrix X and a set of objective variables is represented by a vector Y, the prediction model 8 formed of the linear regression model is expressed by the following Formula (1).

$$Y = AX + b \tag{1}$$

Here, A and b are parameters to be determined. It is possible to use a least-square method or the like to determine the parameters. Assuming that an explanatory variable of the learning data set is XL and an objective variable thereof is YL, the parameter can be obtained by the following Formula (2).

$$A, b = \mathrm{argmin} \| Y_L - AX_L - b \|^2 \tag{2}$$

The prediction performance evaluation unit 14 evaluates the prediction performance of the plurality of prediction models 8 based on the evaluation data set. For example, a root mean square error (RMSE) is used as an evaluation index. The RMSE is expressed by the following Formula (3).

$$\mathrm{RMSE} = \sqrt{\| Y_E - AX_E b \|^2 / N} \tag{3}$$

Here, YE and XE are an objective variable and an explanatory variable of the evaluation table data set, respectively, and N is the number of entries of the evaluation data set. A prediction value calculated by the prediction model 8 corresponding to each class and the performance of the prediction model 8 are returned to the class generation unit 5. When the performance of each of the prediction models 8 evaluated by the prediction performance evaluation unit 14 is lower than a predetermined reference level, the class generation unit 5 performs classification again. As a result, the plurality of prediction models 8 calculated by the prediction model calculation unit 6 are updated. In this manner, the classification and update of the prediction model 8 are performed by returning the evaluation result of the prediction performance evaluation unit 14 to the class generation unit 5, and it is possible to improve the prediction performance of each of the prediction models 8 by repeating this update processing.

The display unit 7 displays an evaluation result of the prediction performance evaluation unit 14 and the like. For example, the display unit 7 displays the plurality of classes, the parameter, and the plurality of prediction models 8 in association with each other. Incidentally, a display mode of the display unit 7 is arbitrary, and various display modes can be taken.

Figure 5:
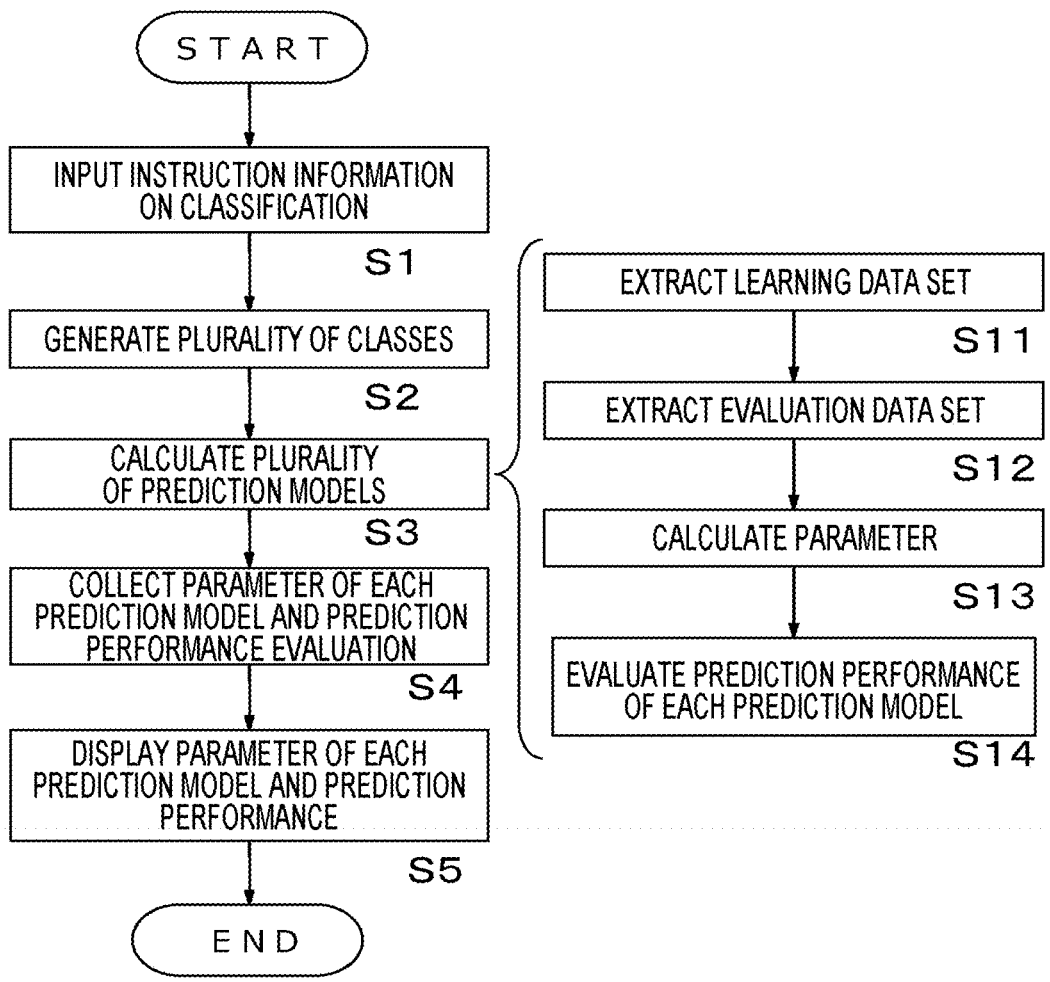
FIG. 5 is a flowchart illustrating a processing operation of the prediction model generation device of FIG. 1.

FIG. 5 is a flowchart illustrating a processing operation of the prediction model generation device 1 of FIG. 1. First, the user inputs the instruction information on classification via the input unit 4 (Step S1).

Next, the class generation unit 5 generates the plurality of classes based on the instruction information (Step S2). Next, the prediction model calculation unit 6 calculates the plurality of prediction models 8 corresponding to the plurality of classes (Step S3).

A flowchart illustrating a detailed processing procedure of Step S3 is illustrated in the right side of FIG. 5. First, the learning data set extraction unit 11 extracts the learning data set corresponding to each of the plurality of classes from the explanatory variable DB 2 and the objective variable DB 3 (Step S11). The evaluation data set extraction unit 12 extracts the evaluation data set corresponding to each of the plurality of classes from the explanatory variable DB 2 and the objective variable DB 3 (Step S12). Next, the parameter calculation unit 13 calculates the parameter included in each of the plurality of prediction models 8 based on the learning data set (Step S13). Next, the prediction performance evaluation unit 14 evaluates the prediction performance of the plurality of prediction models 8 based on the evaluation data set (Step S14). Thus, the process of Step S3 in FIG. 5 is ended.

When the process of Step S3 in FIG. 5 is ended, next, the parameter of each of the prediction models 8 and the performance evaluation thereof obtained by the prediction performance evaluation unit 14 are collected (Step S4), the collected information, that is, the parameter and the prediction performance of each of the prediction models 8 are displayed on the display unit 7 (Step S5).

Although not illustrated in the flowchart of FIG. 5, whether the performance of each of the prediction models 8 is higher than the predetermined reference level may be determined based on the performance evaluation obtained by the prediction performance evaluation unit 14, and the processing may return to Step S1 and start again from classification if the performance is determined not to be higher than the reference level.

In this manner, the classification is performed based on the instruction information of the user, the learning data set and the evaluation data set are extracted based on the classification, the parameters of the plurality of prediction models 8 are calculated based on the extracted learning data set, and each prediction performance of the plurality of prediction models 8 is evaluated based on the extracted evaluation data set in the first embodiment. As a result, it is possible to improve the prediction performance of each of the prediction models 8 by devising the classification.

Second Embodiment

In a second embodiment, each prediction model 8 is set as an ensemble model in which a plurality of prediction submodels are combined.

Figure 6:
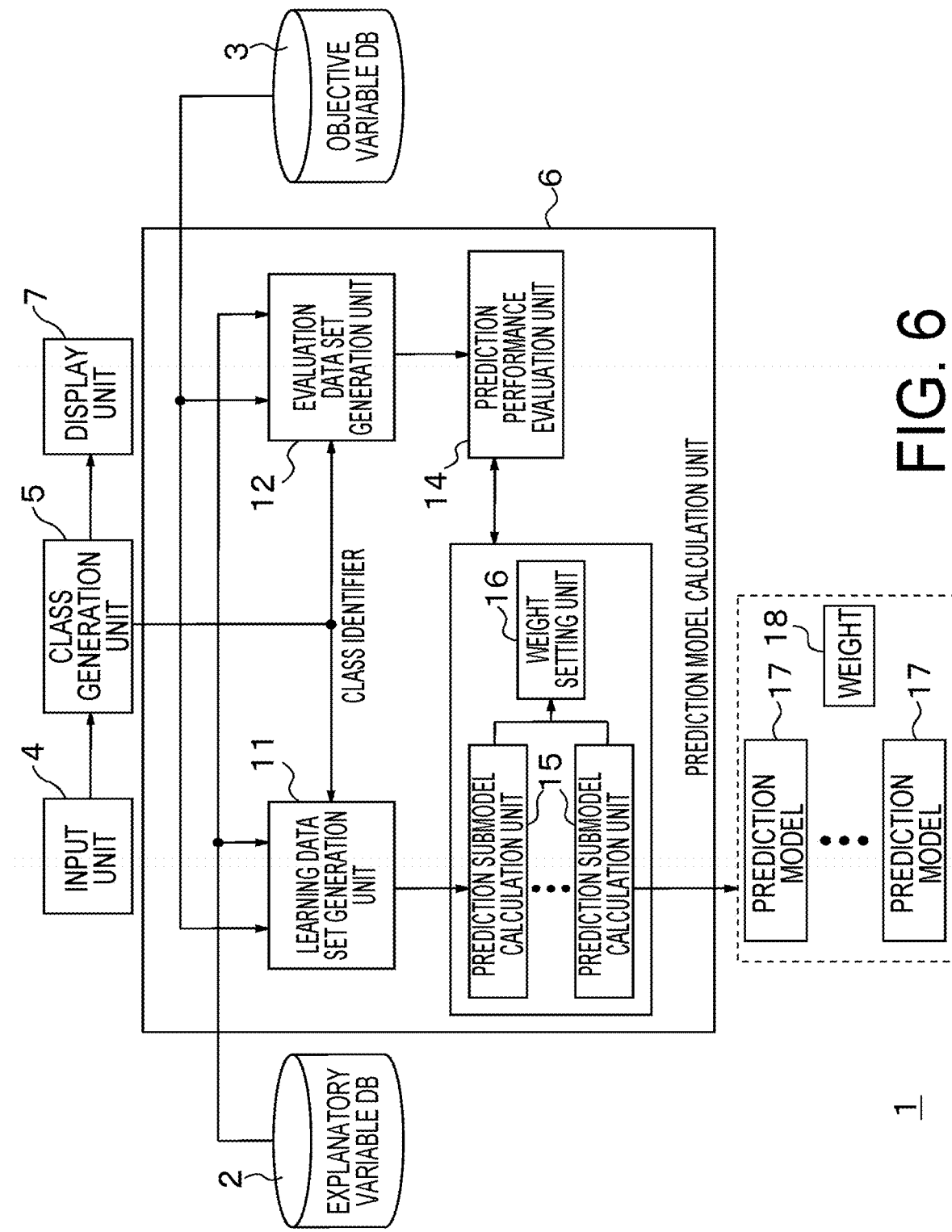
FIG. 6 is a block diagram illustrating a schematic configuration of a prediction model generation device according to a second embodiment.

FIG. 6 is a block diagram illustrating a schematic configuration of a prediction model generation device 1 according to the second embodiment. A processing operation of a parameter calculation unit 13 in a prediction model calculation unit 6 of the prediction model generation device 1 of FIG. 6 is different from that of the parameter calculation unit 13 of FIG. 4.

The parameter calculation unit 13 in FIG. 6 includes a plurality of prediction submodel calculation units 15 and a weight setting unit 16 for each of the plurality of prediction models 8. Each of the prediction submodel calculation units 15 calculates each of a plurality of prediction submodels 17 based on a corresponding parameter.

The weight setting unit 16 sets a weight 18 to be assigned to each of the plurality of prediction submodels 17. Various methods are conceivable as a method of setting the weight 18. Here, an example of assigning the weight 18 so as to be inversely proportional to a prediction error will be described as an example. It is assumed that the number of the prediction submodels 17 is M, and prediction performance of each of the prediction submodels 17, that is, the RMSE is ei (i=1 ... M). The weight wi (i=1 ... M) assigned to each of the prediction submodels 17 is expressed by the following Formula (4).

$$w_i = \frac{\frac{1}{e_i}}{\sum_{j=1}^{M} \frac{1}{e_j}} \quad (4)$$

At this time, a prediction value y generated by the prediction model 8 is expressed by the following Formula (5) when a prediction value yi (i=1 ... M) generated by each of the prediction submodels 17 is used.

$$y = \sum_{i=1}^{M} w_i y_i \quad (5)$$

As expressed by Formula (5), the prediction value y of each of the prediction models 8 is a value obtained by adding values obtained by multiplying prediction values of the respective prediction submodels 17 constituting each of the prediction models 8 by the corresponding weights 18.

Figure 7:
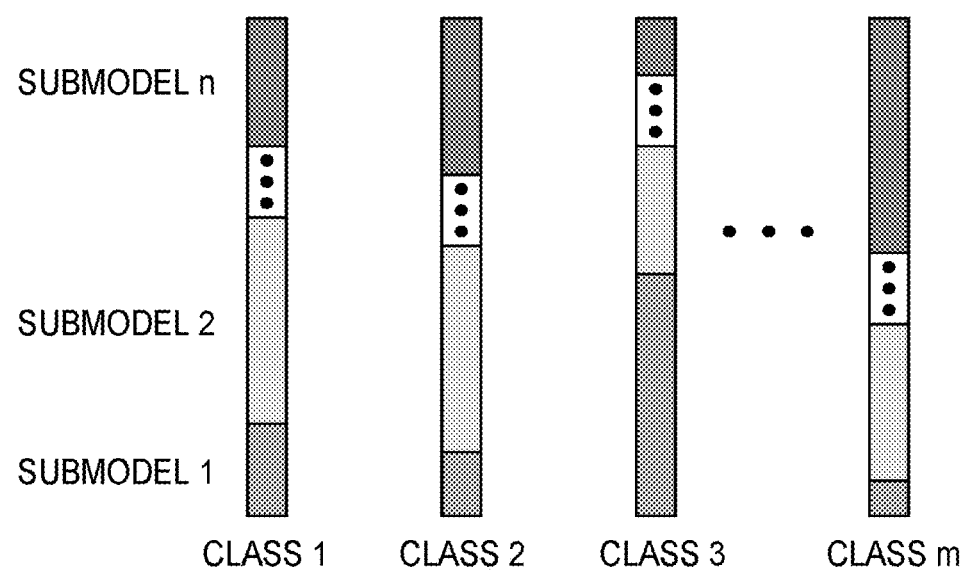
FIG. 7 is a graph visualizing information indicating each ratio of weights of a plurality of submodels constituting each of a plurality of prediction models.

FIG. 7 is a graph visualizing information indicating each ratio of the weights 18 of the plurality of submodels included in each of the plurality of prediction models 8 corresponding to the plurality of classes. The graph of FIG. 7 may be displayed on the display unit 7. In the example of FIG. 7, the weight 18 of the prediction submodel 17 is different for each class. The display unit 7 may display a performance evaluation value of each of the prediction models 8 together with the graph of FIG. 7. The user can adjust the weight 18 of each of the prediction submodels 17 or review the classification such that the performance evaluation value of each of the prediction models 8 becomes high. In FIG. 7, the ratio of the weight 18 of each of the prediction submodels 17 is illustrated as a bar graph. The ratio of the weight 18 of each of the prediction submodels 17 may be displayed in another display form.

In this manner, each of the prediction models 8 has the plurality of prediction submodels 17 for which the weights 18 can be individually adjusted in the second embodiment. Thus, it is easy to further improve the performance of each of the prediction models 8 by not only reviewing the classification but also adjusting the weight 18 of each of the prediction submodels 17.

The prediction model generation device 1 according to the above-described first and second embodiments can be applied for various purposes. For example, the prediction model 8 for the power demand prediction may be generated, or the prediction model 8 for weather forecasting may be generated.

At least a part of the prediction model generation device 1 described in the above embodiments may be configured by hardware or software. When configured by the software, a program to implement at least some functions of the prediction model generation device 1 may be stored in a storage medium, such as a flexible disk and a CD-ROM, and then may be read and executed by a computer. The recording medium is not limited to a detachable storage medium, such as a magnetic disk and an optical disc, and may be a fixed recording medium, such as a hard disk and a memory.

In addition, the program to implement at least some functions of the prediction model generation device 1 may be distributed through a communication line (including radio communication) such as the Internet. Further, the program that has been encrypted, modulated, or compressed, may be distributed through a wired line or a wireless line, such as the Internet, or may be stored in a recording medium and then may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A prediction model generation device comprising:
processing circuitry configured to:
store a plurality of explanatory variables that affect demand of power;
store a plurality of objective variables that express prediction values:
input instruction information on classification based on at least one of a date and time condition and an environmental condition;
generate a plurality of classes based on the instruction information;
calculate a plurality of prediction models corresponding to the plurality of classes,
extract a learning data set corresponding to each of the plurality of classes from among the plurality of explanatory variables and the plurality of objective variables;
extract an evaluation data set corresponding to each of the plurality of classes from among the plurality of explanatory variables and the plurality of objective variables;
calculate a parameter included in each of the plurality of prediction models based on the learning data set;
evaluate prediction performance of the plurality of prediction models based on the evaluation data set;
calculate a plurality of prediction submodels, based on a corresponding parameter for each of the plurality of prediction models; and
set weights based on prediction errors to be given to each of the plurality of prediction submodels,
wherein prediction values based on the plurality of prediction models are values obtained by adding values obtained by multiplying the prediction values of the plurality of prediction submodels by corresponding weights.

2. The device of claim 1, wherein
the generate the plurality of classes outputs a class identifier to identify the plurality of classes,
the extract the learning data set extracts the learning data set in accordance with the class identifier,
the extract the evaluation data set extracts the evaluation data set in accordance with the class identifier, and
the calculate the parameter calculates a parameter of a prediction model in accordance with the class identifier.

3. The device of claim 1, wherein
the processing circuitry is further configured to:
display the plurality of classes, the parameter, and the plurality of prediction models in association with each other.

4. The device of claim 1, wherein
the evaluate the prediction performance is configured to display information indicating a ratio of weights of the plurality of prediction submodels for each of the plurality of classes.

5. The device of claim 1, wherein
the calculate the plurality of prediction models calculates the plurality of prediction models to perform a demand prediction of a predetermined object or target service.

6. A prediction model generation method comprising:
storing a plurality of explanatory variables that affect demand of power in a first storage unit;
storing a plurality of objective variables in a second storage unit;
inputting instruction information on classification based on at least one of a date and time condition and an environmental condition via an input unit;
generating a plurality of classes based on the instruction information; and
calculating a plurality of prediction models corresponding to the plurality of classes,
when calculating the plurality of prediction models corresponding to the plurality of classes,
extracting a learning data set corresponding to each of the plurality of classes from among the plurality of explanatory variables stored in the first storage unit and the plurality of objective variables stored in the second storage unit;
extracting an evaluation data set corresponding to each of the plurality of classes from among the plurality of explanatory variables stored in the first storage unit and the plurality of objective variables stored in the second storage unit;
calculating a parameter included in each of the plurality of prediction models based on the learning data set;
evaluating prediction performance of the plurality of prediction models based on the evaluation data set;
calculating a plurality of prediction submodels, based on a corresponding parameter for each of the plurality of prediction models; and
setting weights based on prediction errors to be given to each of the plurality of prediction submodels,
wherein prediction values based on the plurality of prediction models are values obtained by adding values obtained by multiplying the prediction values of the plurality of prediction submodels by corresponding weights.

7. The method of claim 6, wherein
the generating the plurality of classes outputs a class identifier to identify the plurality, of classes,
the extracting the learning data set extracts the learning data set in accordance with the class identifier,
the extracting the evaluation data set extracts the evaluation data set in accordance with the class identifier, and
the calculating the parameter calculates a parameter of a prediction model in accordance with the class identifier.

8. The method of claim 6 further comprising
displaying the plurality of classes, the parameter, and the plurality of prediction models in association with each other.

9. The method of claim 6, wherein
the evaluating the prediction performance comprises displaying information indicating a ratio of weights of the plurality of prediction submodels tier each of the plurality of classes.

10. The method of claim 6, wherein
the calculating the plurality of prediction models calculates the plurality of prediction models to perform a demand prediction of a predetermined object or target service.

11. A non-transitory computer-readable recording medium that stores a program, the program that causes a computer to execute:
   storing a plurality of explanatory variables that affect demand of power;
   storing a plurality of objective variables;
   inputting instruction information on classification based on at least one of a date and time condition and an environmental condition;
   generating a plurality of classes based on the instruction information; and
   calculating a plurality of prediction models corresponding to the plurality of classes,
   the calculating the plurality of prediction models comprises:
   extracting a learning data set corresponding to each of the plurality of classes from among the plurality of explanatory variables and the plurality of objective variables;
   extracting an evaluation data set corresponding to each of the plurality of classes from among the plurality of explanatory variables and the plurality of objective variables;
   calculating a parameter included in each of the plurality of prediction models based on the learning data set;
   evaluating prediction performance of the plurality of prediction models based on the evaluation data set;
   calculating a plurality of prediction submodels, based on a corresponding parameter for each of the plurality of prediction models; and
   setting weights based on prediction errors to be given to each of the plurality of prediction submodels,
   wherein prediction values based on the plurality of prediction models are values obtained by adding values obtained by multiplying the prediction values of the plurality of prediction submodels by corresponding weights.

12. The recording medium of claim 11, wherein
the generating the plurality of classes outputs a class identifier to identify the plurality of classes,
the extracting the learning data set extracts the learning data set in accordance with the class identifier,
the extracting the evaluation data set extracts the evaluation data set in accordance with the class identifier, and
the calculating the parameter calculates a parameter of a prediction model accordance with the class identifier.

13. The recording medium of claim 11 further comprising displaying the plurality of classes, the parameter, and the plurality of prediction models in association with each other.

14. The recording medium of claim 11, wherein
the evaluating the prediction performance comprises displaying information indicating a ratio of weights of the plurality of prediction submodels for each of the plurality of classes.

15. The recording medium of claim 11, wherein
the calculating the plurality of prediction models calculates the plurality of prediction models to perform a demand prediction of a predetermined object or target service.

* * * * *